(12) United States Patent
Fyvolent

(10) Patent No.: US 11,224,176 B2
(45) Date of Patent: Jan. 18, 2022

(54) VERTICAL GROWING SYSTEM

(71) Applicant: Hyperponic, LLC, St. Petersburg, FL (US)

(72) Inventor: Douglas Fyvolent, St. Petersburg, FL (US)

(73) Assignee: HYPERPONIC, LLC, St. Petersburg, FL (US)

( * ) Notice: Subject to any disclaimer, the term of this patent is extended or adjusted under 35 U.S.C. 154(b) by 452 days.

(21) Appl. No.: 16/389,406

(22) Filed: Apr. 19, 2019

(65) Prior Publication Data
US 2019/0239459 A1 Aug. 8, 2019

Related U.S. Application Data

(63) Continuation of application No. 16/183,297, filed on Nov. 7, 2018, now Pat. No. 11,109,547.

(60) Provisional application No. 62/583,706, filed on Nov. 9, 2017.

(51) Int. Cl.
*A01G 31/06* (2006.01)
*A01G 7/04* (2006.01)
*A01G 25/16* (2006.01)

(52) U.S. Cl.
CPC .............. *A01G 31/06* (2013.01); *A01G 7/045* (2013.01); *A01G 25/16* (2013.01)

(58) Field of Classification Search
CPC .......... A01G 31/06; A01G 7/045; A01G 9/022
See application file for complete search history.

(56) References Cited

U.S. PATENT DOCUMENTS

2014/0000162 A1   1/2014   Blank

OTHER PUBLICATIONS

Vertical Hydroponic Systems, https://howtogrowmarijuana.com/vertical-hydroponic-systems/, pp. 1 to 38, May 16, 2018.

*Primary Examiner* — Monica L Barlow
(74) *Attorney, Agent, or Firm* — Shumaker, Loop & Kendrick, LLP; Jeffrey B. Fabian

(57) ABSTRACT

Disclosed is a growing system that includes a hollow grow tower with planting units configured to hold plants disposed on the tower exterior where the planting units have a passage that extends into the tower interior. The tower also includes a drain port at one end and a water-dispensing nozzle at the other end. The nozzle includes outlet apertures in fluid communication with the interior of the tower where one or more of the nozzle outlet apertures may be square. An enclosure surrounds the tower, and one or more light sources are mounted on the enclosure to direct light towards the tower. The tower and enclosure can be connected to a suspension frame that suspends the entire system off the ground. The system may include a closed-loop irrigation system and a multi-tank cleaning system. System variables, such as water flow, temperature, lighting, and water nutrient level can be computer controlled.

13 Claims, 18 Drawing Sheets

VERTICAL GROWING SYSTEM

REFERENCE TO RELATED APPLICATION

This application is a continuation of, and claims priority to, U.S. Nonprovisional Application No. 62/583,706 filed on Nov. 9, 2017, U.S. patent application Ser. No. 16/183,297 filed on Nov. 7, 2018 the entirety of which is incorporated herein by reference.

TECHNICAL FIELD AND BACKGROUND

The present invention relates generally to horticultural systems, and more particularly, vertical growing systems configured for closed-loop irrigation operation and suspension off the ground.

Conventional horticultural systems utilize trays of planters that in some cases are stacked on top of each other preventing even distribution of light to the plants. As the plants are irrigated, the excess water collects in trays, basins, soil, or flows through drains in the surrounding floor space and is subject to evaporation. Water that is not evaporated can promote the growth of mold and mildew that is harmful to the plants. Furthermore, the irrigation water may contain calcium, lime, or chemicals from fertilizers that makes proper disposal of the excess water difficult and that can clog components of the irrigation system.

It is, therefore, an object of the present invention to provide a growing system that provides for a more efficient use of space, lighting, and water resources while mitigating against degradation in water flow and the growth of mold and mildew. The disclosed system utilizes a central grow tower configured for closed-loop irrigation that militates against loss of excess irrigation water and against standing water conducive to mold and mildew growth. The tower is surrounded by an enclosure supporting light sources that provide an even distribution of lighting to plants housed within planting units on the exterior surface of the tower. The tower and enclosure can be secured to an overhead suspension frame so that the entire system is suspended off the ground, thereby making the surrounding area easier to clean. The system also utilizes a unique nozzle design for irrigation that can include squared apertures for improved water dispersion. The system can also be used with a multi-tank cleaning system utilized between harvests. One or more sensor units and electronic control units enable control of various system parameters through a computer, such as lighting, water flow rates, water temperature, and water nutrient levels.

SUMMARY

A first embodiment provides a growing system having an elongated hollow body used as a growing tower. The elongated hollow body has a vertically aligned first axis that extends between a first end and a second end of the tower and a second axis transverse to the first axis. A drain port extends from the interior cavity of the elongated body through the exterior surface. For irrigation, the system uses a water distribution nozzle with an inlet port and a plurality of outlet apertures in fluid communication with the interior cavity. A plurality of grow units are disposed along a length of the elongated hollow body exterior surface. The grow units have a passage configured to house a plant where the passage extends through the exterior surface of the elongated body to the interior cavity. The length defines an inlet end and an outlet end, and the nozzle is proximal to the inlet end while the drain port is proximal to the outlet end. An enclosure at least partially surrounds the elongated hollow body with one or more light sources mounted to the interior of the enclosure where the light sources are configured to direct light toward the elongated hollow body.

The growing system can further include a suspension frame formed from a plurality of interconnected struts. The suspension frame is proximal to the first end of the elongated body and secured to both the elongated body and the enclosure. A utility support member, such as a ring suitable for supporting a suspended ladder, can be placed between the elongated body and the enclosure and secured to the suspension frame. A fan can be installed above the elongated body and secured to the suspension frame to promote air flow.

In some embodiments, the enclosure can be formed with a plurality of vertically aligned panels that rotate to allow access to the elongated body. The panels can also be configured to translate toward and away from the elongated body by, for instance, securing the panels to a suspension frame strut with a sliding track.

In other embodiments, one or more of the nozzle outlet apertures are square, and the nozzle includes one or more baffles within the interior of the nozzle. Water can be provided to the plants by an irrigation source having a feed conduit in fluid communication with the nozzle inlet and a return conduit in fluid communication with the drain port.

The irrigation source can include a pump with a pressure input line and a pressure output line in fluid communication with the feed conduit through a pump output valve. The irrigation source can also include a first tank having (i) a first output line in fluid communication with the feed conduit through a first-output-line valve, (ii) a first intake line in fluid communication with the return conduit through a first-intake-line valve, and (iii) a first pressure control output line in fluid communication with the pressure input line through a first-pressure-control-line valve. The irrigation source can also include a second tank with (i) a second output line in fluid communication with the feed conduit through a second-output-line valve, (ii) a second intake line in fluid communication with the return conduit through a second-intake-line valve, and (iii) a second pressure control output line in fluid communication with the pressure input line through a second-pressure-control-line valve.

For temperature control, the irrigation source can also include at least one water chiller having a temperature input line and a temperature output line where the temperature output line is in fluid communication with the feed conduit through a chiller output valve. In this embodiment, the first tank further includes a first temperature control output line in fluid communication with the chiller temperature input line through a first-temperature-control-output valve, and the second tank includes a second temperature control output line in fluid communication with the chiller temperature input line through a second-temperature-control-output valve.

Some embodiments can include a computing device configured to generate a graphical user interface having a flow-rate input function where selection of the flow-rate input function generates a flow-rate message. An electronic control unit is in signal communication with the pump and configured to adjust the pump speed in response to the flow-rate message transmitted by the computing device. The computing device can also be configured to generate a lighting function on the graphical user interface where selection of the lighting function generates a lighting message transmitted to the same or a different electronic control unit. The electronic control unit is in signal communication with the one or more light sources and is configured to adjust the intensity of the light source in response to the lighting message transmitted by the computing device.

Yet other embodiments can utilize a cleaning unit having a return tank in fluid communication with the drain port of the elongated body and a supply tank in fluid communication with the return tank through a sump pump. The supply tank is also in fluid communication with the nozzle inlet port through a recirculating pump. The cleaning unit can include a cart having a recess sized to accommodate the return tank.

BRIEF DESCRIPTION OF THE FIGURES

Features, aspects, and advantages of the present invention are better understood when the following detailed description of the invention is read with reference to the accompanying figures, in which.

DETAILED DESCRIPTION

Figure 1:
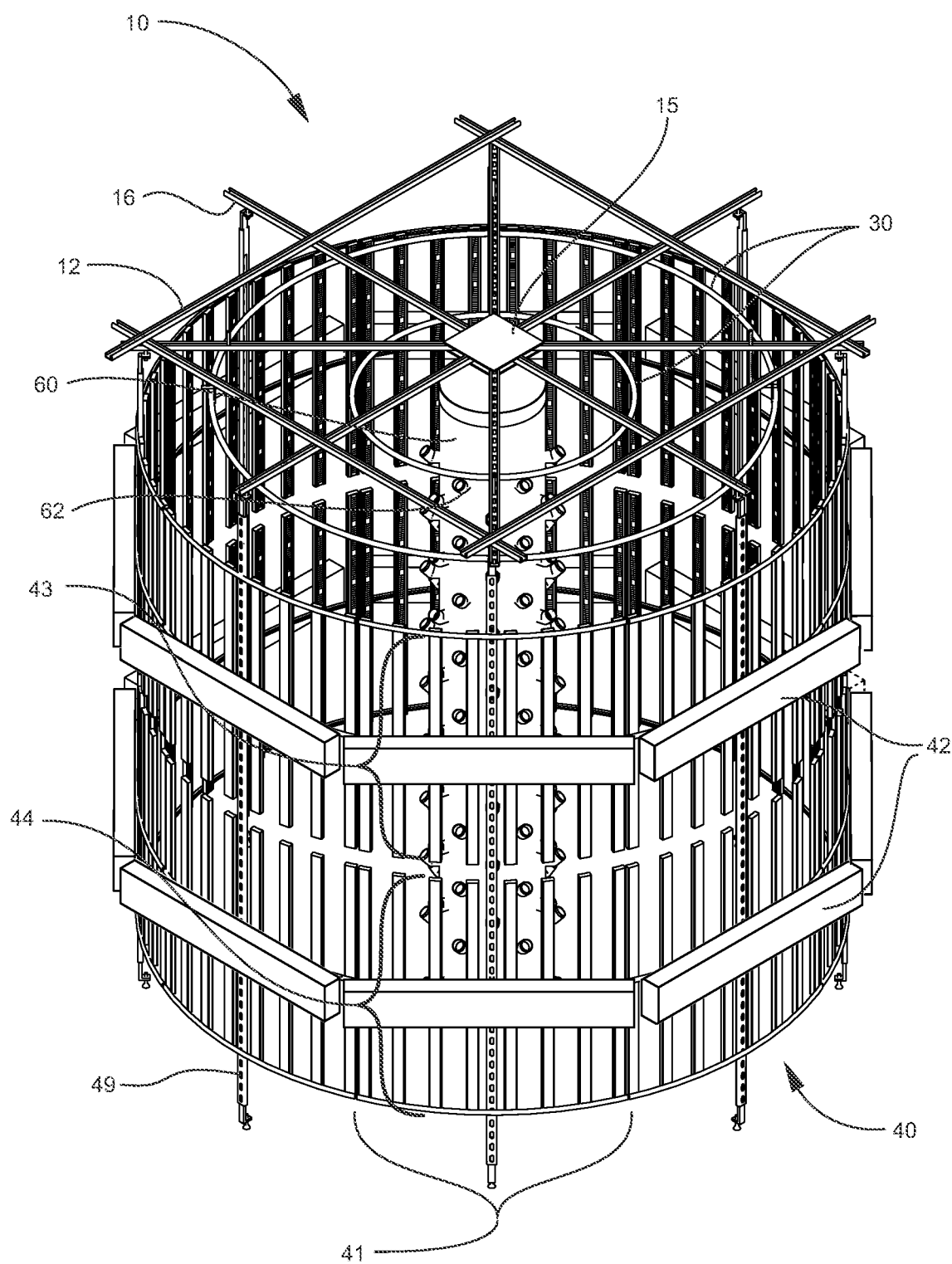
FIG. 1 an elevated, isometric view of one embodiment of the vertical growing system.
Figure 2:
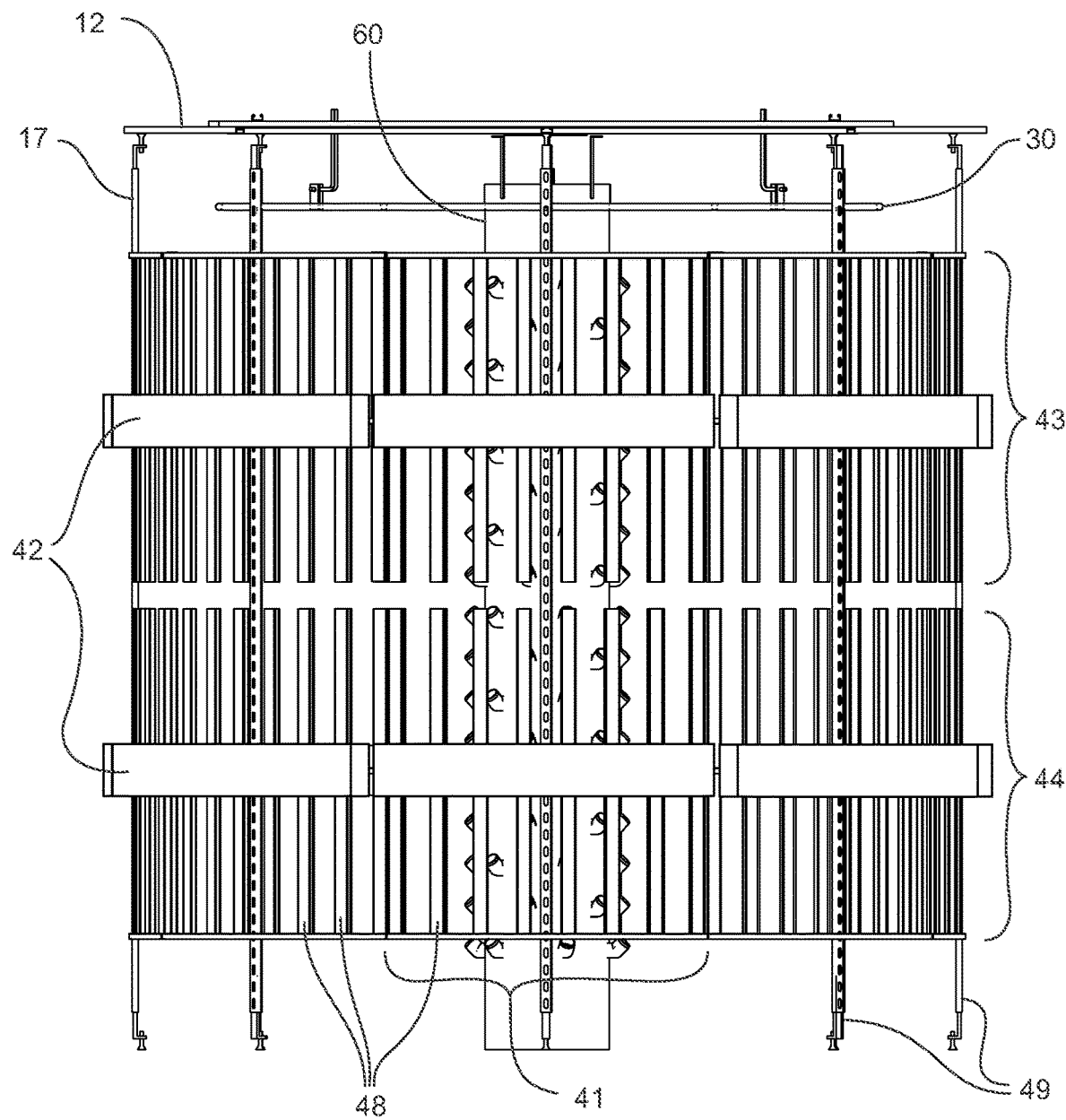
FIG. 2 is a front view of one embodiment of the vertical growing system.
Figure 3:
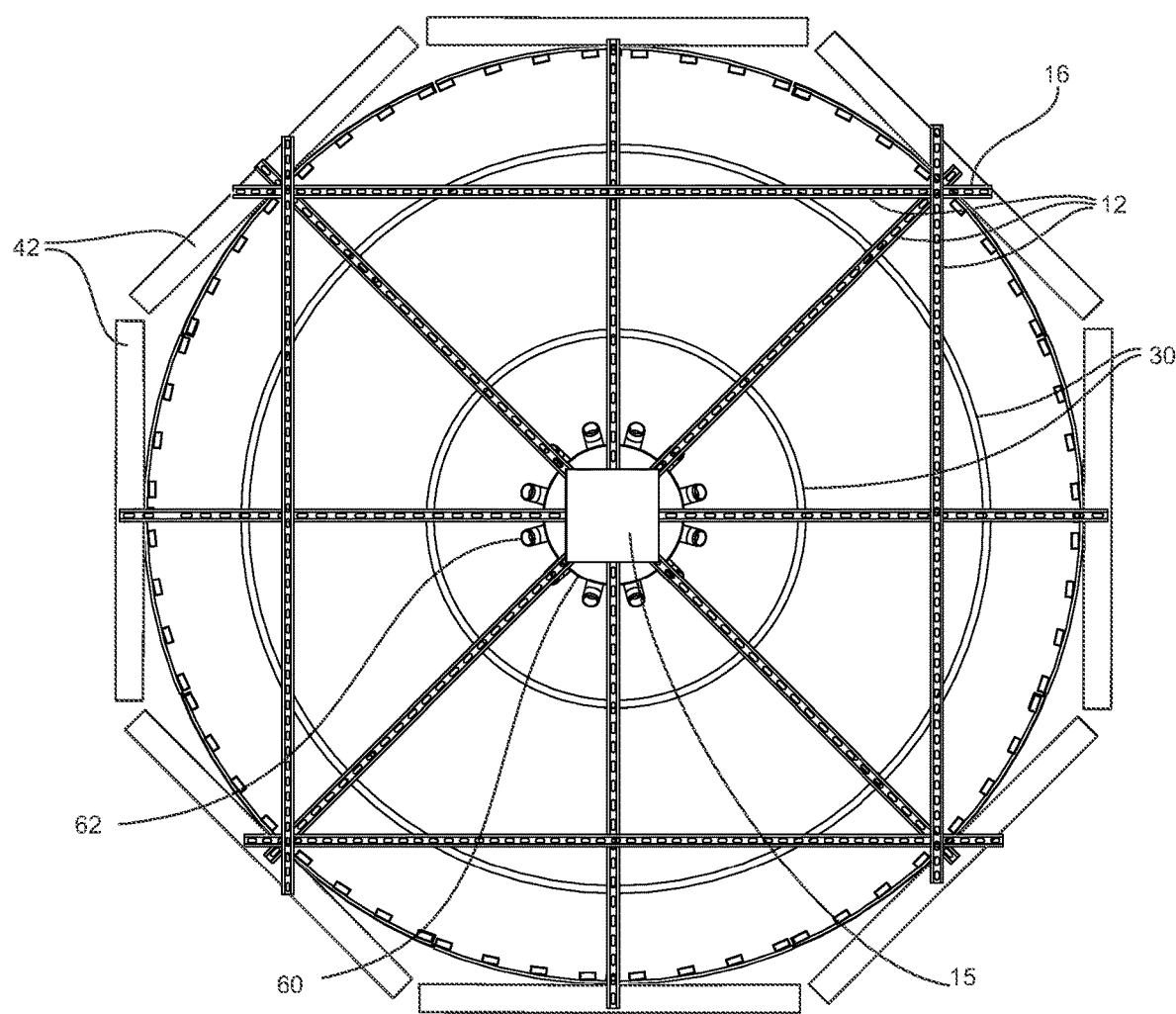
FIG. 3 is a top view of one embodiment of the vertical growing system.
Figure 4:
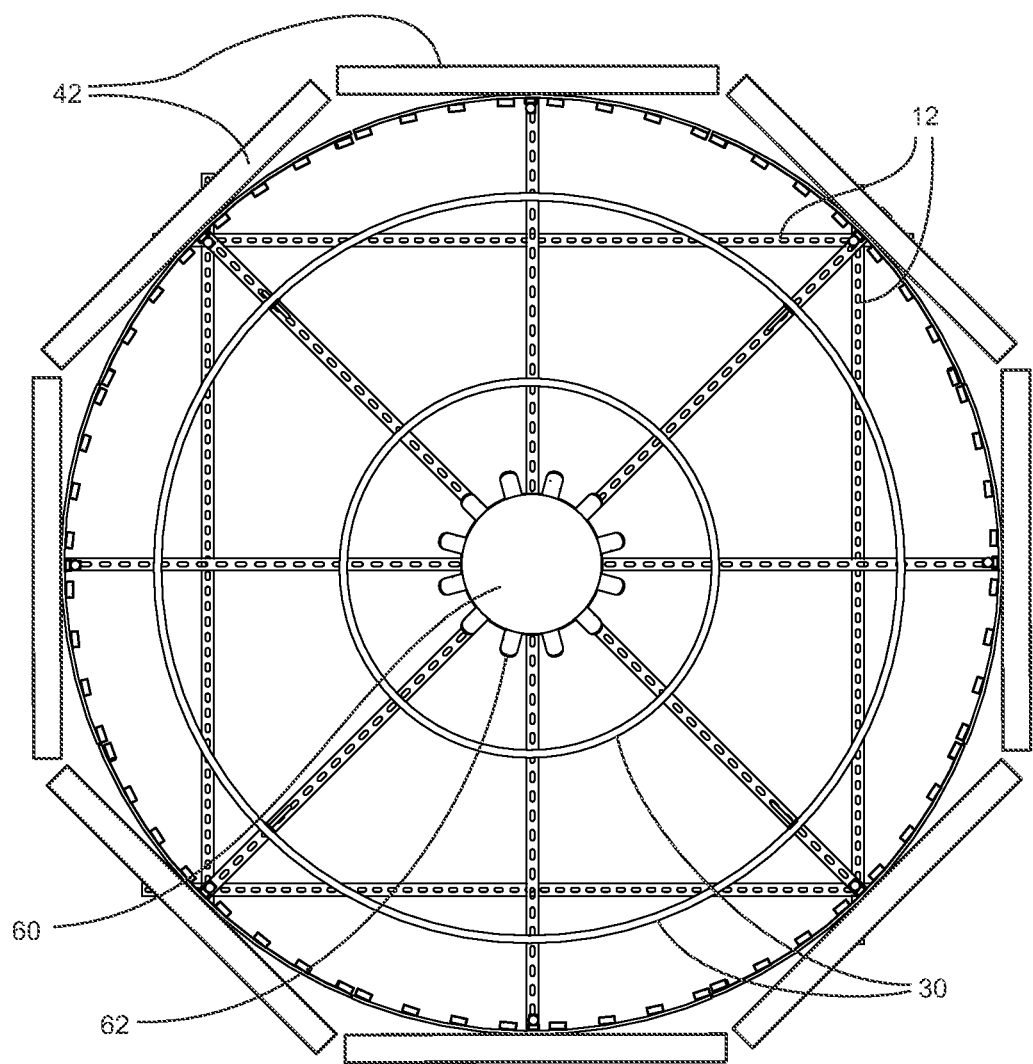
FIG. 4 is a bottom view of one embodiment of the vertical growing system.

The present invention will now be described more fully hereinafter with reference to the accompanying pictures in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole (as would be appreciated by one of ordinary skill in the art).

Disclosed is a vertical growing system configured to operate with closed-loop irrigation where water and nutrients are continuously recycled through the system, thereby reducing the water and nutrients lost to evaporation, soil absorption, or other factors. The continuous irrigation system results in little or no standing water, thereby militating against the growth of mold and mildew that can harm plants and inhibit growth. The system can be suspended off the ground making the surrounding floor space easier to clean and further militating against the growth of mold and mildew. The system includes an enclosure for supporting a lighting system that provides an even distribution of light to the subject plants. The system is also configured for use with a multi-tank irrigation system that provides water and nutrients through a nozzle having a squared aperture design that evenly distributes water and that is more resistant to clogging than conventional nozzles having circular apertures. A multi-tank cleaning unit can be connected to the system to clean the system between harvests. The system can be computer controlled to precisely adjust lighting intensity, water and nutrient flow, water temperature, air flow, or other relevant growing parameters over the course of a harvest cycle. Overall, the system has exhibited a three-fold increase in plant production for the same square footage of floor space as well as a 90% improvement in water utilization and a 50% reduction in fertilizer cost.

FIGS. 1 through 4 show isometric, side, top, and bottom views of a vertical growing system according to one exemplary embodiment that includes a suspension frame 10, one or more utility support members 30 an enclosure 40 for mounting lighting sources 42, and a central grow tower 60 capped by a water-distribution nozzle 70. The grow tower 60, utility support members 30, and enclosure 40 can be mounted to the suspension frame 10 that in turn can be affixed to a ceiling or other vertical support structure so that the entire system is suspended off the ground. The system is modular in that the suspension frame 10 can be connected to adjacent suspension frames 10 (not shown) that are also suspended off the ground to form rows of vertical growing systems.

The exemplary suspension frame 10 depicted in the attached figures is formed using eight slotted suspension struts 12 that are approximately ten feet long with a 1⅞ inch by 1 inch rectangular profile. Four of the suspension struts 12 are arranged in a square. Two of the suspension struts 12 bisect each side of the square, and two suspension struts 12 extend between the diagonals. To add rigidity to the suspension frame 10, the bisecting and diagonal suspension struts 12 are all fixed to a one-square-foot, quarter-inch-thick center plate 15 using one or more bolts, screws, welding or other attachment means. One or more of the suspension struts 12 have an end portion 16 that extends beyond the square such that the end portions 16 can be mated to suspension struts 12 in adjacent growing systems. Those of ordinary skill in the art will appreciate that the configuration of the suspension frame 10 embodiment shown in the attached figures is not intended to be limiting, and other suitable configurations and geometries can be utilized. For instance, the bisecting and diagonal suspension struts 12 can be formed from two separate pieces with one end secured to the center plate, additional or fewer bisecting or diagonal struts 12 can be used, or the outer suspension struts can be arranged in a pentagon, hexagon, or other suitable shape.

Figure 5:
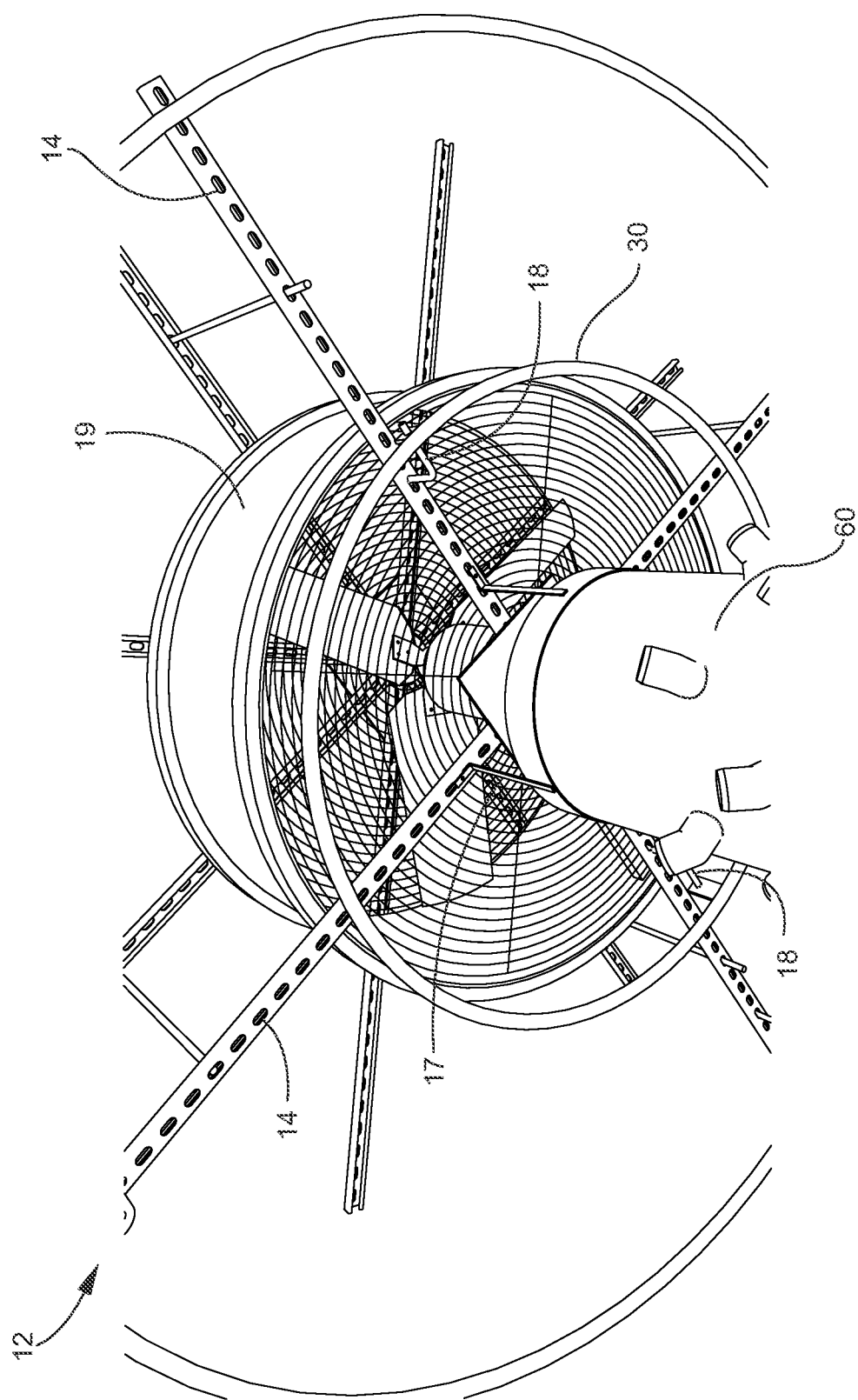
FIG. 5 is an isometric view of one embodiment of the vertical growing system.

As shown more clearly in FIG. 5, the grow tower 60 and utility support members 30 are connected to the suspension struts 12 using one or more L- or Z-brackets 17, threaded rods 18, and fasteners that extend through the slots 14 in the suspension struts. The system optionally includes a fan 19, such as the forty-two inch fan 19 shown in FIG. 5 that mounts to the suspension struts 12 above the grow tower 60. The fan 19 prevents stagnant, humid air that is otherwise conducive to mold and mildew growth. FIG. 5 is not intended to be limiting, and the grow tower 60 and utility support members 30 can be affixed to the suspension frame 10 using welding, soldering, an adhesive, or other means known to those of skill in the art, and the fan 19 can be placed in any location that allows the facilitation of adequate air flow.

Figure 6:
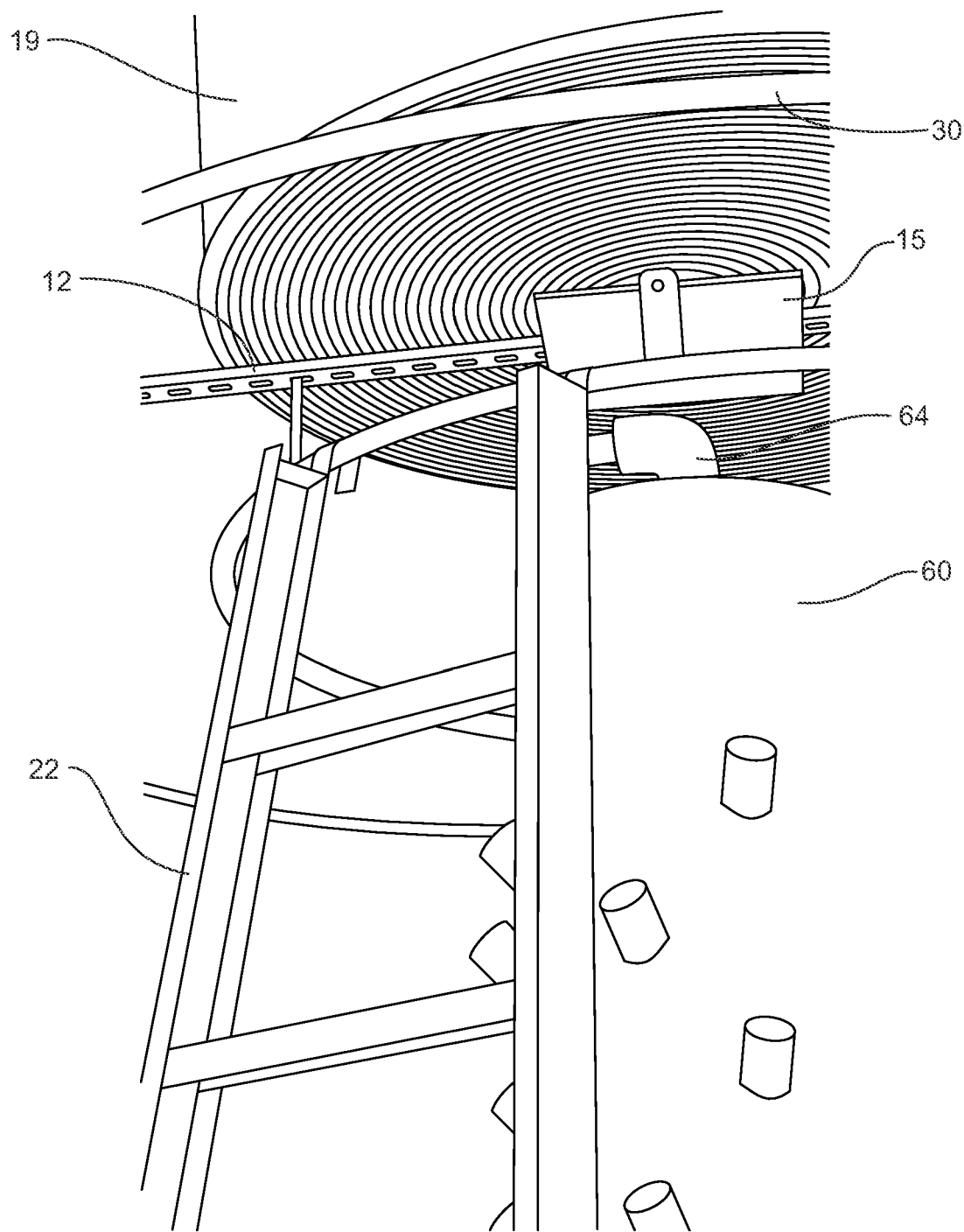
FIG. 6 is a side view of one embodiment of the vertical growing system showing use of a ladder secured to support members.
Figure 8:
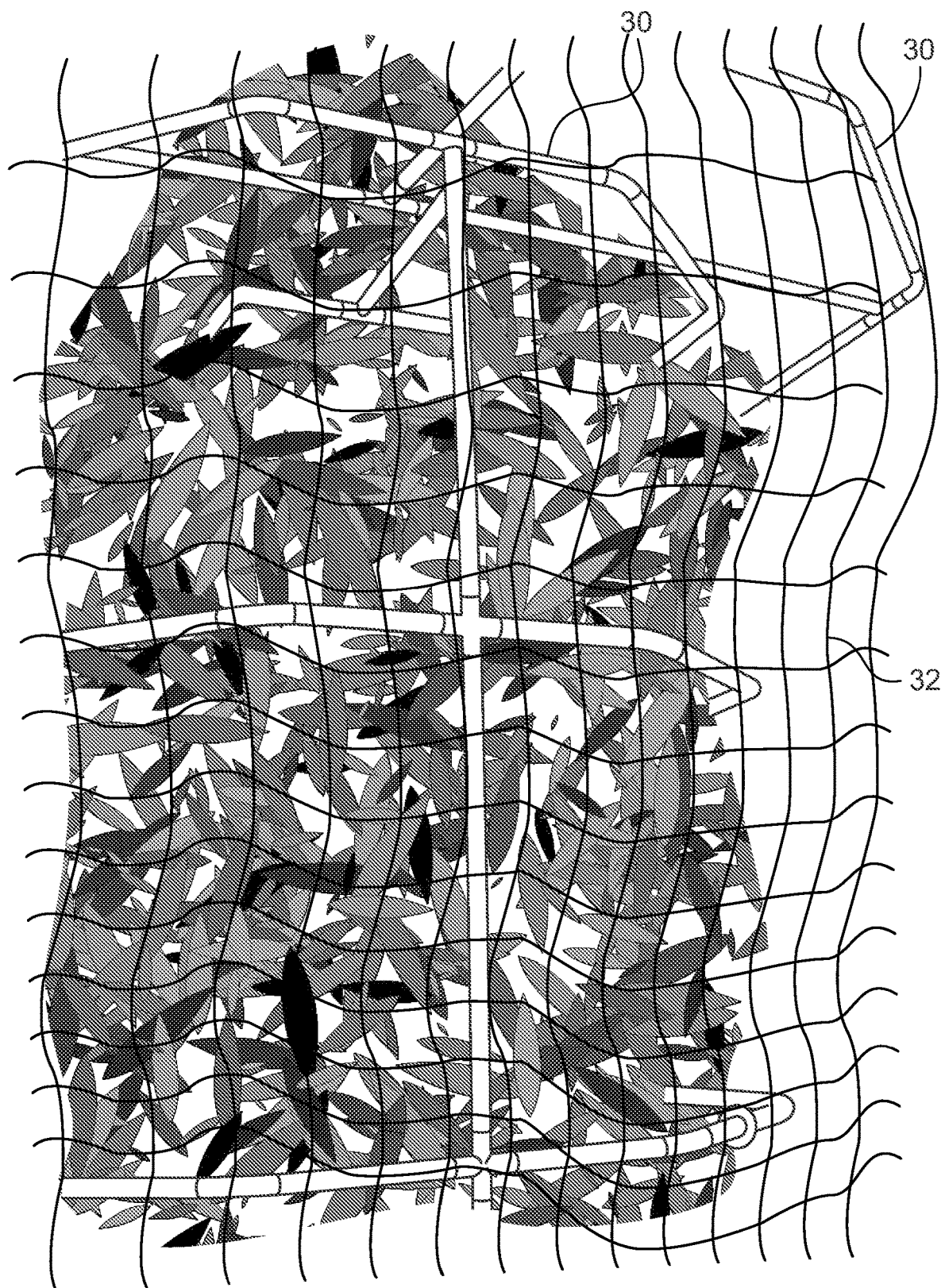
FIG. 8 illustrates use of a lattice or mesh to support plants growing on the system.

The system can incorporate one or more utility support members 30 that enable use of a ladder 22 that does not contact the ground, as shown in FIG. 6. The utility support members 30 are also used to support a netting, mesh, or lattice structure 32 that can be made of rope, metal, lumber or any material and with any configuration capable of supporting plants as they grow outward from the grow tower, as depicted in FIG. 8. The exemplary embodiment shown in the attached figures utilizes a first utility support member 30 that is formed as a ring forty-seven inches in diameter and a second utility support member 30 formed as a ring that is eighty inches in diameter where both utility support members are approximately three-quarters of an inch in thickness.

The grow tower 60 is surrounded by an enclosure 40 that supports one or more lighting sources 42 as well as power units or control units in electrical communication with the lighting sources 42. The enclosure 40 shown in the attached figures is divided into eight separate panels 41 having an upper frame 43 and a lower frame 44 that each support a source 42 for a total of sixteen lighting sources 42 mounted on the enclosure 40. In one embodiment, the lighting sources support energy efficient, LED lighting that extends around the entire circumference of the enclosure 40 to evenly illuminate the central grow tower 60.

The upper frames 43 and lower frames 44 each include a first arcuate slotted strut 46 and a second arcuate slotted strut 47 that are approximately forty-two inches long and that are horizontally aligned extending partially around the circumference of the enclosure 40. The upper frames 43 and lower frames 44 each also include one or more vertically aligned support elements 48 that extend between the first arcuate strut 46 and the second arcuate strut 47. The embodiment depicted in the attached figures includes eight support elements 48 for each upper frame 43 and each lower frame 44 that are affixed to the arcuate struts 46 & 47 using bolts, screws, or other fastening means. The support elements 48 can include interior conduits extending along the length of the support elements to receive wires or cables that supply power to the lighting sources 42.

Figure 7:
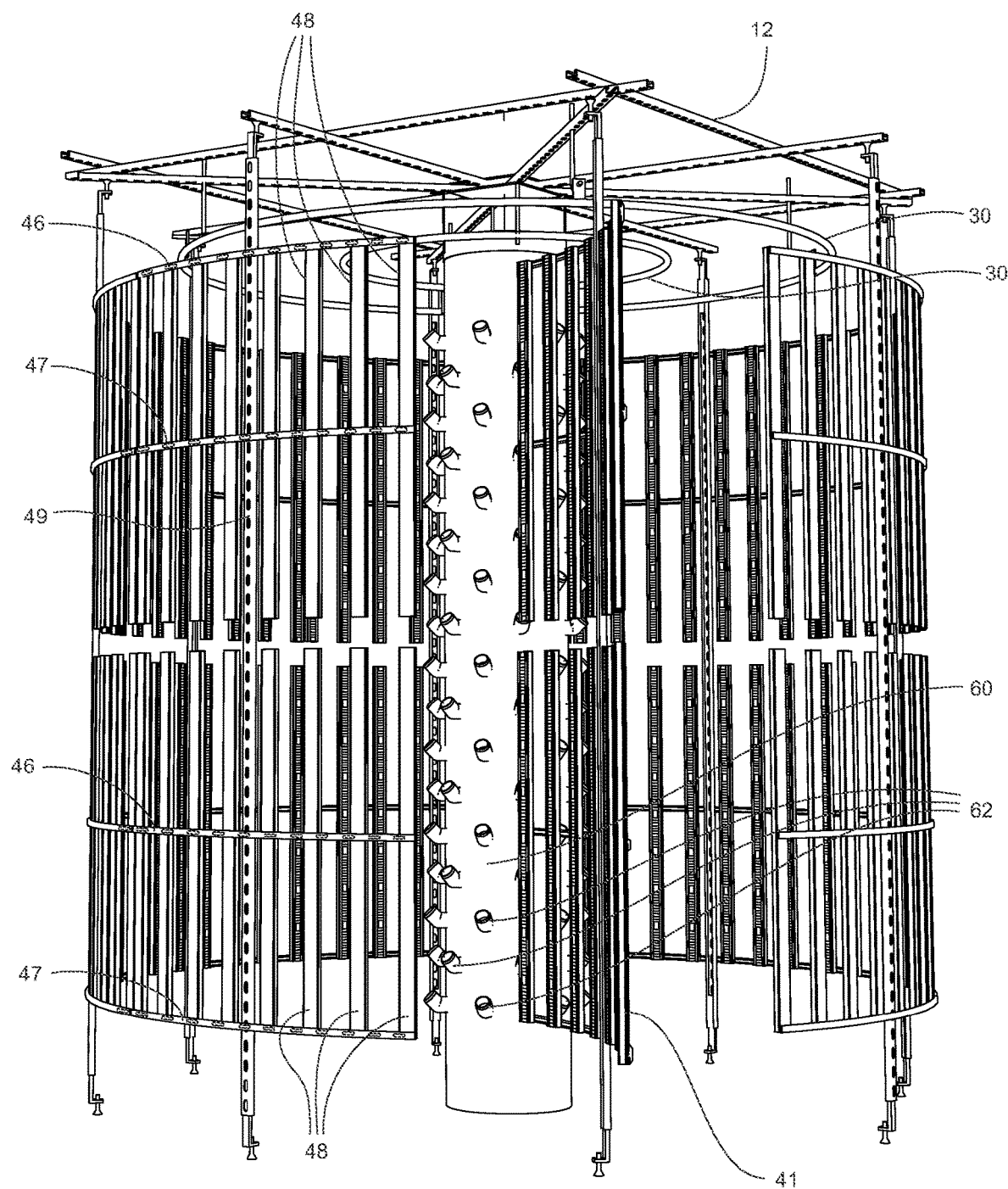
FIG. 7 is a side view of one embodiment of the vertical growing system showing rotation of a panel to provide access to a grow tower.

Each panel further includes a vertically aligned slotted panel strut 49 that is affixed to at least one of the arcuate struts 46 & 47 on each of the upper frame 43 and the lower frame 44. The panel struts 49 can be connected to the suspension frame 10 using a swivel joint that allows the panels 41 to rotate about the panel strut 49, as illustrated in FIG. 7, which facilitates access to the grow tower 60 and interior of the enclosure 40.

Figure 9:
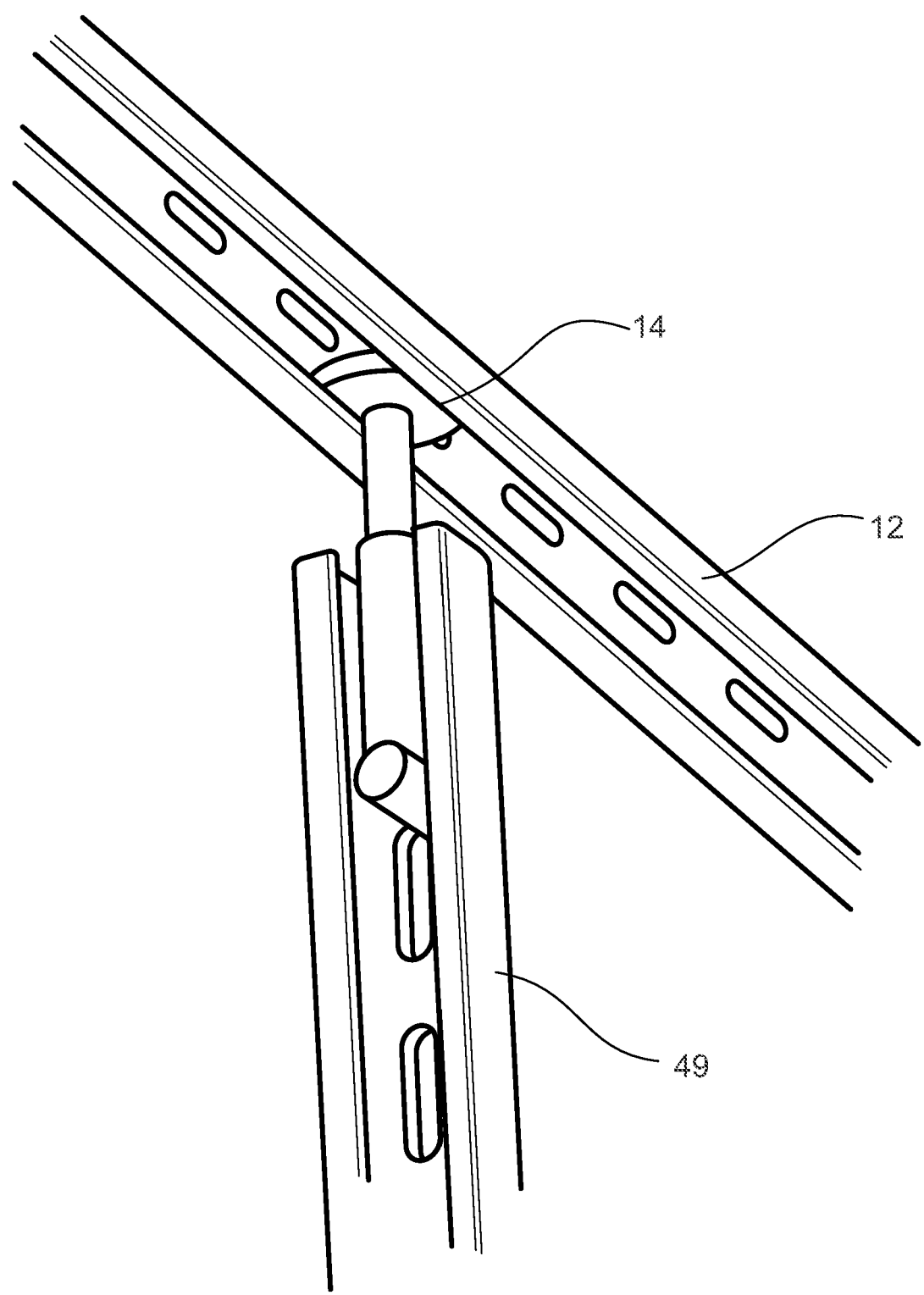
FIG. 9 illustrates a panel translating mechanism.
Figure 10:
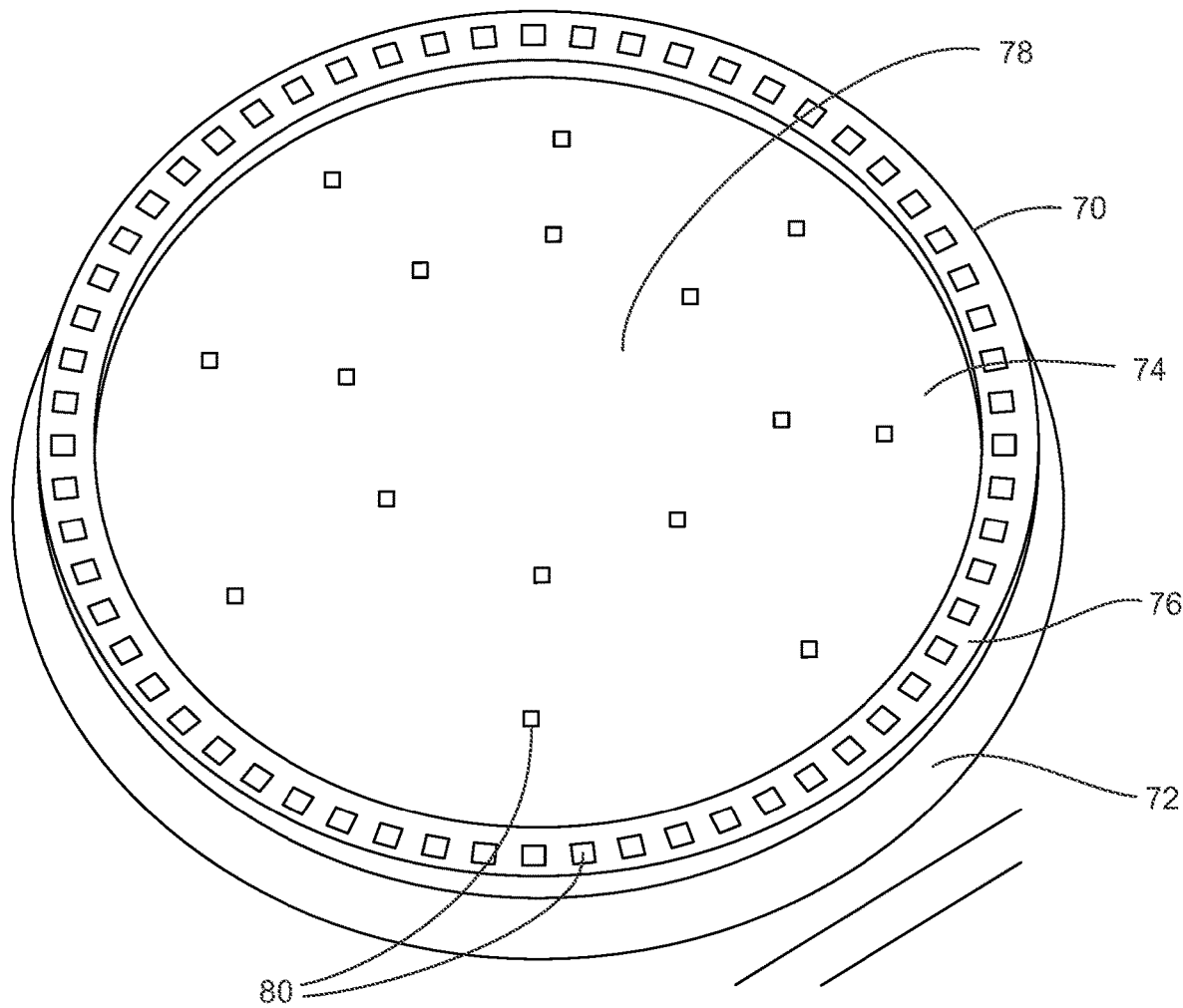
FIG. 10 illustrates an exemplary water-dispensing nozzle with squared apertures.
Figure 11:
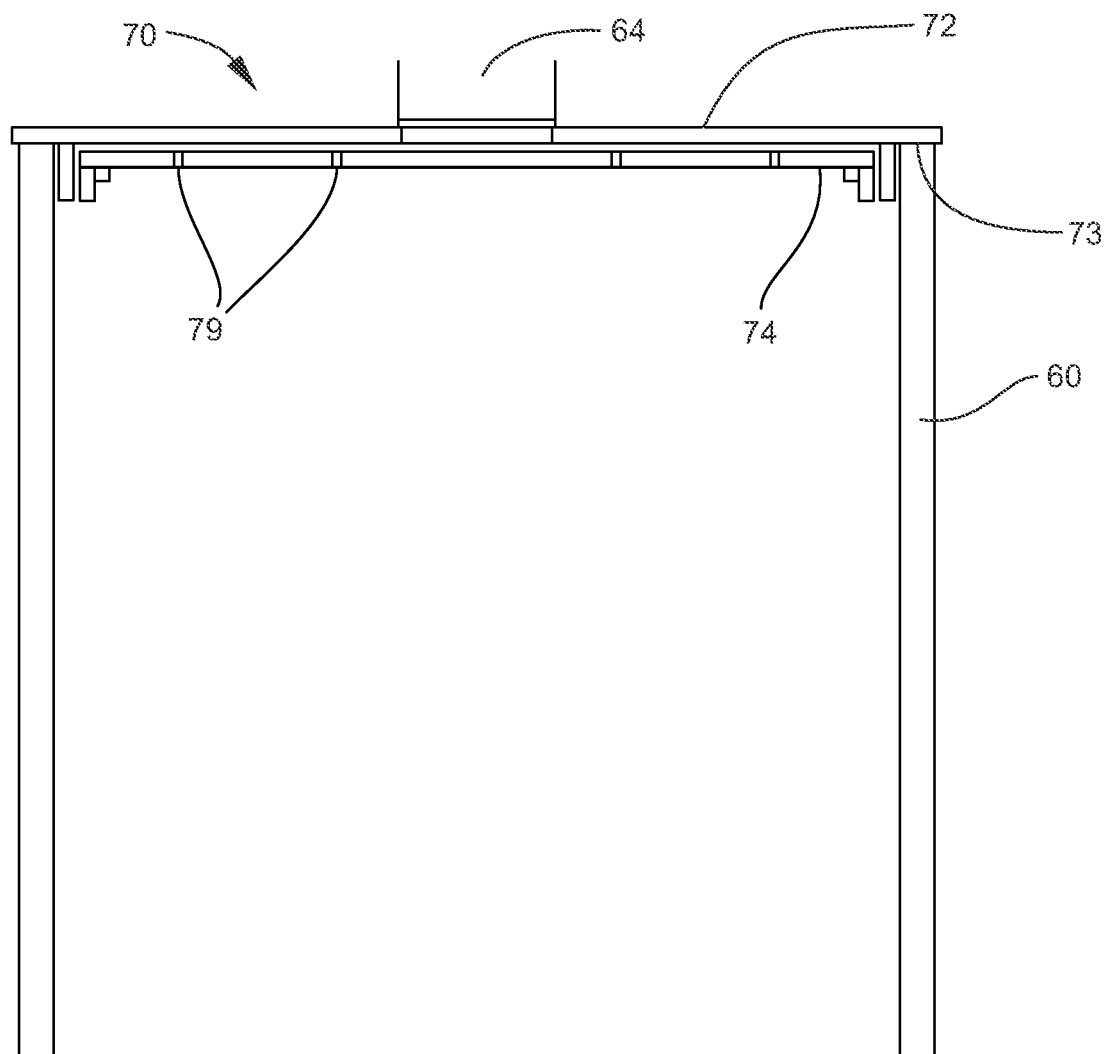
FIG. 11 is a side view of an exemplary water-dispensing nozzle installed on a grow tower.
Figure 12:
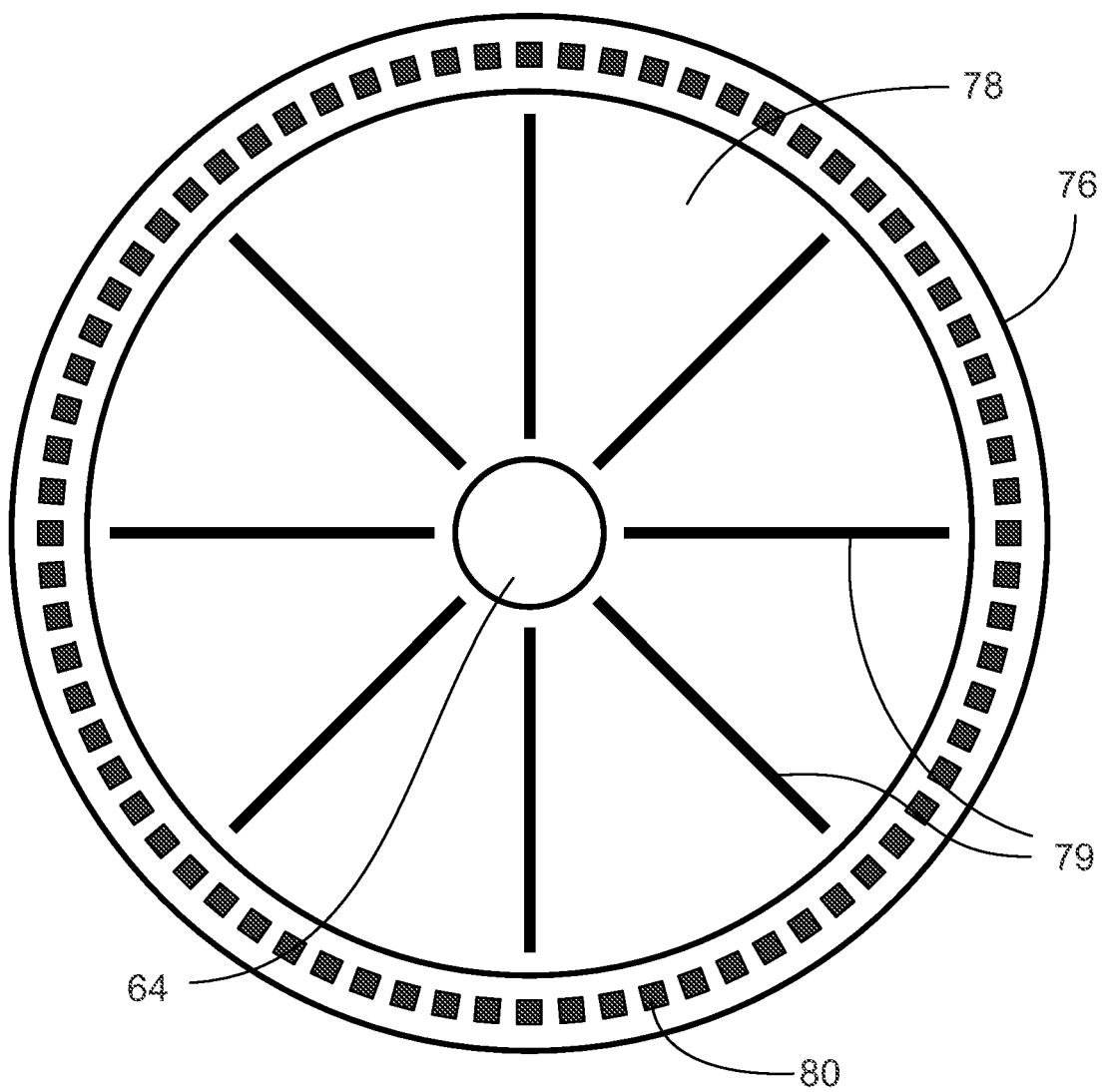
FIG. 12 is a bottom, see-through view of an exemplary water-dispensing nozzle showing the interior baffles.
Figure 13:
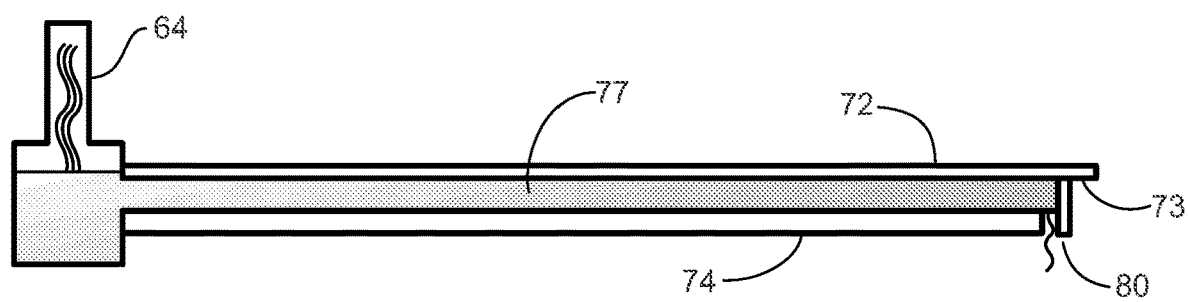
FIG. 13 is a side, cutaway view of an exemplary water-dispensing nozzle installed on a grow tower.

As illustrated in FIG. 9, the suspension struts 12 can include a track that houses a glide wheel 14 fixed to the panel strut 49 that permits the panels 41 to slide toward and away from the grow tower 60 as the wheel rotates or glides within the suspension strut 12 track, thereby permitting a degree of control over the intensity of the lighting received by plants on the grow tower 60 as the light intensity depends in part on the distance between the light source and the target (i.e., the grow tower 60). Any suitable slide or translation mechanism can be used to translate the panels 41 towards and away from the grow tower 60, including, for instance, a ball bearing slide mount or a yoke or U-shaped bracket attached to the panel strut 49 that extends over the top of the suspension strut 12.

The exemplary enclosure 40 embodiment shown in the attached figures is not intended to be limiting, and other suitable structures can be used. For instance, the enclosure 40 can use more or less than eight panels 41 in a hexagonal or octagonal configuration, the upper frame 43 and lower frame 44 can be combined into a single continuous frame, or the support elements 48 can be replaced with continuous sheets of metal, glass, fiberglass, or other suitable rigid materials.

The grow tower 60 shown in the attached figures is hollow and cylindrical with a plurality of planting units 62 that extend outward from the exterior surface of the grow tower 60 and that are each configured to house one or more plants as they grow. The grow tower 60 can be constructed from polyvinyl chloride (PVC), stainless steel, fiberglass, or another material of sufficient strength and corrosion resistance. The planting units 62 extend from the exterior surface of the grow tower 60 at an approximately forty-five degree angle so that the plants do not conceal each other as they grow, thereby ensuring that the amount of water and light that reach each planting unit 62 is optimized. The planting units 62 are tubular with a passage (not shown) that extends through to the interior of the grow tower such that the roots of plants housed within the planting units can extend into the interior of the grow tower 60. The hollow design of the grow tower 60 helps ensure that the water and nutrients are properly distributed, without obstruction, to the plant roots that might otherwise tend to grow around any structures within the tower and block water flow to lower portions of the tower.

The exemplary grow tower 60 shown in the attached figures is approximately ten feet tall and sixteen inches in diameter. The grow tower 60 supports approximately one-hundred planting units 62 each having a diameter of about $1^{14}/_{16}$ (1.875) inches. The planting units 62 are arranged in rows of six units that extend around the circumference of the grow tower 60 at the same height where the rows are spaced about five inches apart along the height of the grow tower 60. Each row may be horizontally displaced or staggered about the circumference of the grow tower 60 relative to the rows immediately above and below to ensure that the plants have adequate vertical room to grow. The above described embodiment is not intended to be limiting, and other configurations can be used for the placement of the planting units 62 along the grow tower 60 to accommodate, for instance, plants of various sizes, plants having various water and nutrient requirements, and various target crop yields. Use of a cylindrical grow tower 60 has the advantage of promoting an even distribution of light and water to the planting units 62, but other geometries and sizes can be used for the grow tower 60 and planting units 62, such as a square or rectangular cross section.

Water and nutrients are fed from an irrigation system to an inlet port 64 at the top of the grow tower 60. The inlet port 64 feeds the water-distribution nozzle 70 that fits as a lid or cap to the top of the grow tower 60. An exemplary water distribution nozzle 70 is shown in FIGS. 10 through 13 and includes a top portion 72 and a bottom portion 74 having an outer ring surface 76 and a central surface 78. The top portion 72 has a diameter of about 16¼ inches and is wider than the bottom portion 74 with a diameter of about 14⅝ inches. The change in diameter between the top portion 72 and the bottom portion 74 creates a beveled edge 73 that allows the nozzle 70 to fit to the top of the grow tower 60. The top portion 72 and bottom portion 74 define an interior chamber 77 that places the inlet port 64 in fluid communication with apertures 80.

Water and nutrients exit the bottom portion 74 of the nozzle 70 through one or more squared apertures 80. The nozzle 70 shown in the attached figures includes approximately sixty-two apertures 80 disposed on the outer ring surface 76 and twelve aperture 80 disposed on the central surface 78. The flow rate of water to the inlet aperture 64 is higher than the flow rate through the apertures 80 so as to create a pressure differential that increases the flow velocity of water and nutrients exiting the bottom portion 74 to the interior of the grow tower 60. As compared to conventional nozzles, use of the squared aperture design provides a more evenly distributed water droplet dispersion profile, a more consistent droplet size, and overall results in a reduction of nozzle clogs due to a build-up of lime, calcium, or other minerals and suspended elements present in the water and nutrient flow in part because the corner edges of the square apertures 80 reduce the surface tension of water droplets exiting the nozzle 70. The square apertures 80 also tend to allow the nozzle 70 to achieve comparable flow rates to conventional designs with less water pressure. The interior chamber 77 of the nozzle 70 also includes one or more baffles 79 that further enhance the flow rate of water through the squared apertures 80 by evenly distributing the incoming water and nutrients to the outer ring surface 76 and apertures 80.

Figure 14:
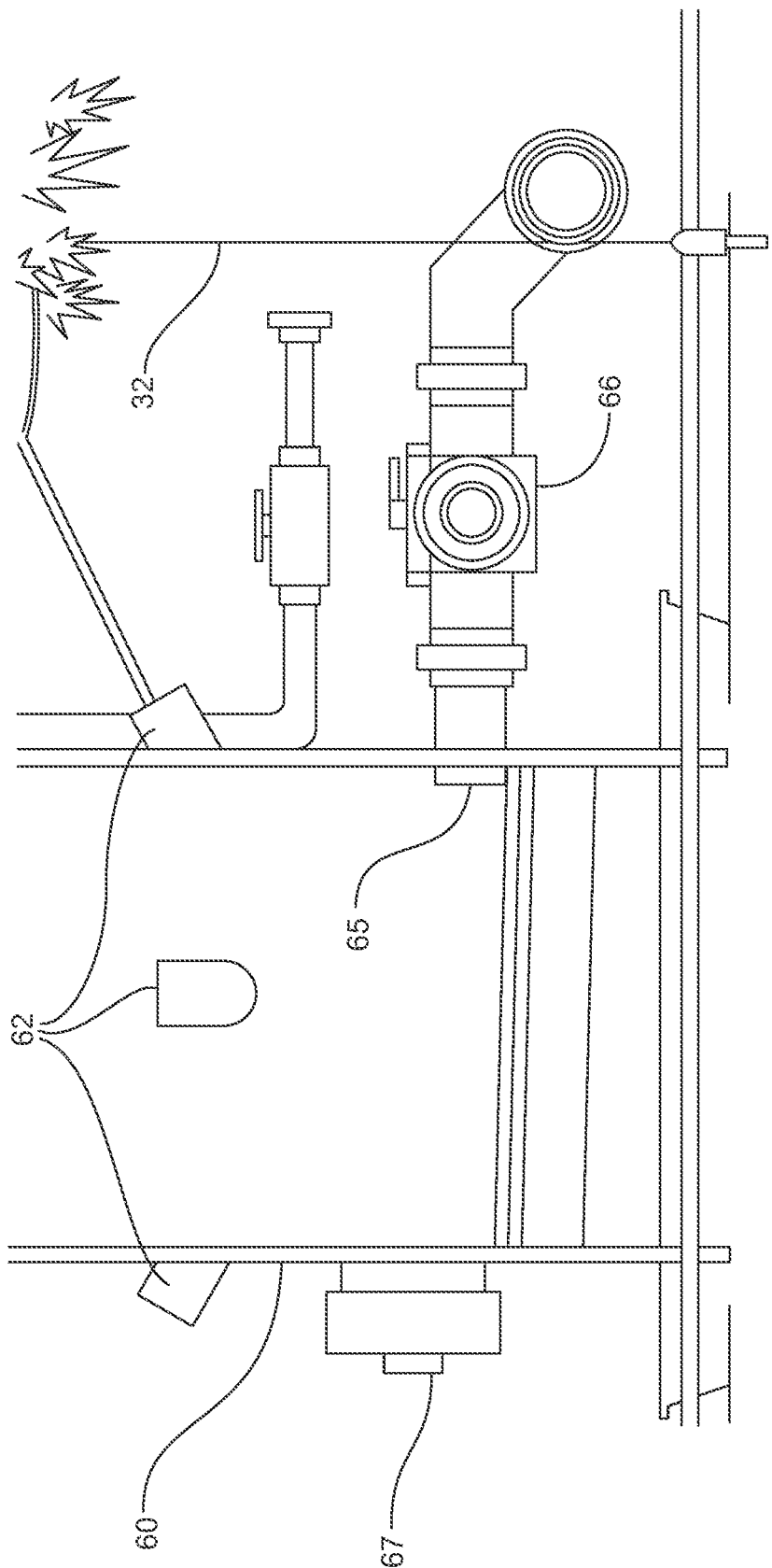
FIG. 14 illustrates the drainage portion of a grow tower according to one embodiment

Water exits the grow tower 60 through a drain line 65 at the bottom of the grow tower 60, as depicted in FIG. 14. The bottom surface of the grow tower 60 can be sloped to facilitate drainage. The drain line 65 includes a valve 66 so that the main water and nutrient drain line 65 can be closed during system cleaning while still allowing any liquid wash to exit through a cleanout port 67.

Figure 15:
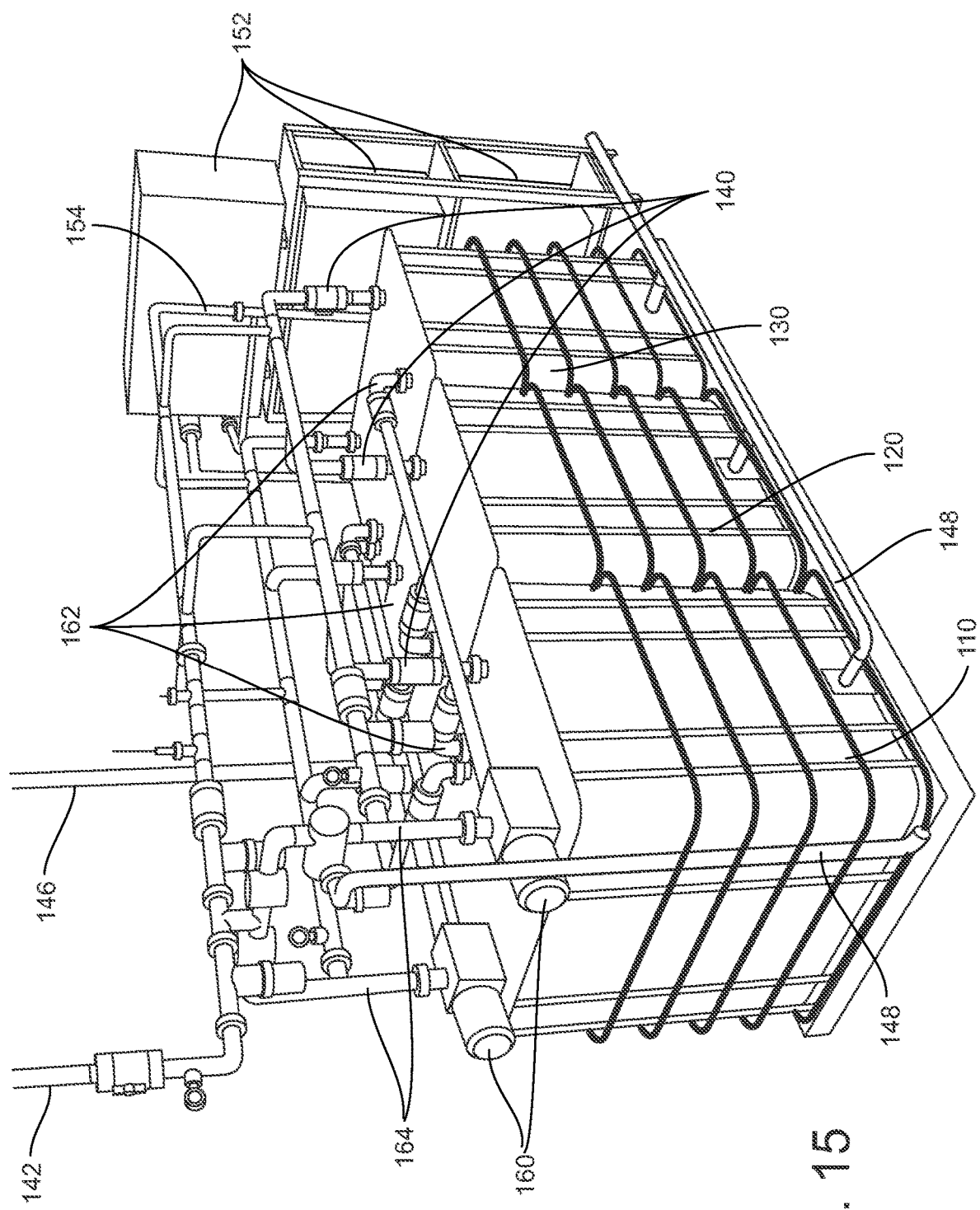
FIG. 15 illustrates an exemplary irrigation system according to one embodiment.
Figure 16:
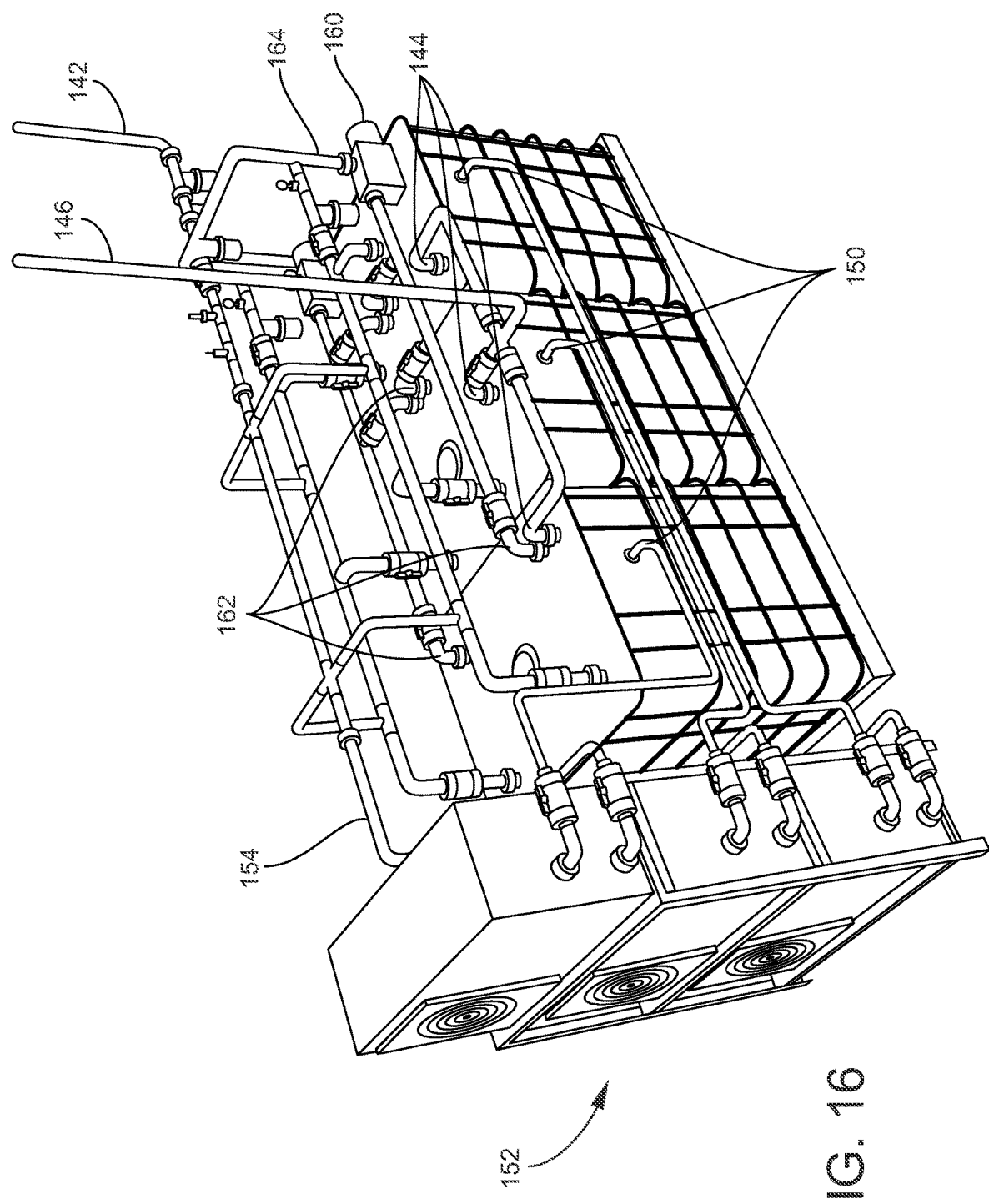
FIG. 16 illustrates an exemplary irrigation system according to one embodiment

An exemplary irrigation system is shown in FIGS. 15 and 16 and includes a first tank 110, a second tank 120, and a third tank 130. Each tank includes one or more output lines 140 in fluid communication with a single feed line 142 that is connected to the nozzle 70 inlet port 64 to supply water and nutrients to the grow tower 60. Each tank (110, 120, 130) also includes one or more intake lines 144 in fluid communication with a single return line 146 that is connected to the grow tower 60 drain line 65. Relief lines 148 are connected to each tank and to the feed line 142 to permit the system to vent excess pressure or drain fluid, as needed.

Some embodiments can optionally utilize a return reservoir and pump (not shown) connected in line between the drain line 65 of the grow tower 60 and the return line 146. The reservoir can be installed at a height below the drain line 65 so that gravity from the height differential facilitates drainage from the grow tower 60 to the reservoir, which is also facilitated in part by the gravitational force generated from the water falling through the interior of the grow tower 60 during irrigation. When fluid level in the reservoir reaches a predetermined level, the pump can activate to pump water through the return line to one of the tanks (110, 120, 130).

The tanks (110, 120, 130) also each have a temperature control output line 150 that is in fluid communication with one or more chiller units 152. The chiller units 152 in turn have a chiller output line 154 that is in fluid communication with the feed line 142. The irrigation system can control the temperature of water flow to the grow tower 60 by using one or more valves to close off the individual tank output lines 140, using separate valve(s) to open the individual tank temperature control output lines 150, and running water from the tanks (110, 120, 130) through the chiller units 152 before supplying water to the feed line 142.

The irrigation system can control water pressure in the feed line 142 using one or more pumps 160. The tanks (110, 120, 130) each have one or more pressure control output lines 162 in fluid communication with the pumps 160. The pumps 160 in turn have a pump output line 164 that is in fluid communication with the feed line 142. To control the water pressure, one or more valves are used to close off the individual tank output lines 140, separate valve(s) are used to open the pressure control output lines 162, and the water is run through the pump(s) 160 before supplying the feed line 142. Controlling water pressure to the feed line 142 in turn adjusts the flow rate of water to the grow tower 60.

Use of a multi-tank configuration permits flexibility in irrigation system operation. For example, the first tank 110 can be used to supply water to the grow tower 60 until such time as the nutrients are depleted at which point the system can be switched over to run from the second tank 120 or the third tank 130. Alternatively, the second tank 120 or the third tank 130 can be used to continuously supply fresh water to the first tank 110 during operation so that the first tank 110 water supply is effectively recharged.

The combination of the irrigation system and the grow tower 60 creates a water-efficient, closed loop system. In conventional irrigation systems, the excess water, which may contain pollutants or contaminants, is absorbed into the ground or growing medium or captured in basin or other reservoir following application to the plants. Excess water absorbed into the ground is not reused and may result in environmental harm, and excess water collected in reservoirs may lead to mold or mildew growth and must be periodically disposed or fed back into the irrigation system. The closed-loop system of the present invention avoids these disadvantages by continuously recirculating water and nutrients until the supply is consumed by the plants or until such time as the supply can be subject to proper disposal. The closed loop system has the advantages of more efficient water and nutrient usage and reduced labor cost. In particular, the system has demonstrated a 90% savings in water, a 50% reduction in fertilizer cost, and a 50% reduction in labor cost.

The irrigation system optionally includes one or more sensor units that continuously monitor system parameters such as water temperature, water flow rate, pH, salinity, nutrient level, oxygen content, carbon dioxide content, water level in the tanks (110, 120, 130) or system conduits, or any other useful parameter relevant to plant growth and system operation. The various sensors can be combined into one or more modular, integrated units that can be conveniently installed and removed.

The sensor data is fed to an electronic control unit and computing device along with other system components, including, for example, the lighting sources 42, the fan 19, or valves in the irrigation system. The computing device is equipped with software configured to save the sensor data to a local or cloud-based storage device and display the sensor data on a graphical user interface ("GUI") along with information from other system components. The GUI may allow users to not only monitor the sensor and component data but also control system parameters through control of various system components, such valves in the irrigation system, the pumps 160, the chiller units 152, fan 19, or lighting sources 42.

As an example of system controls, the GUI may allow users to control the system water pressure and in turn water flow rate to the plants by providing input functions whereby the user can close valves at the tank output lines 140, open valves at the pressure control output lines 162, and control the power output of the pumps 160 connected to the feed line 142. Selection of the input function on the GUI causes the computing device to generate a message that is transmitted to the electronic control unit. In response to the message received from the computing device, the electronic control unit transmits a signal to actuate the appropriate irrigation system valves or adjust power levels to, and performance of, the pumps 160, chillers 152, lighting sources 42, fan 19, or other system components. The various system components may be turned off or on or adjusted through a continuous range of preset values. As an example, the various system valves can use a solenoid to adjust between fully open or fully closed in response to a signal from the control unit, or the valves can use a stepper motor to adjust through a range of partially open or partially closed states.

In some embodiments, the software is programmable to vary system parameters over time, such as a program that adjusts the lighting levels during the course of a day or from day-to-day or week-to-week. In other embodiments, the software can dynamically control certain variables, such as dynamically adjusting the volume of water flow through the chiller units 152 to maintain a constant, preset water temperature as the ambient temperature increases or decreases. For instance, a significant increase in ambient temperature may raise the water temperature as measured by thermocouples in the sensor unit. The software may then partially close and open irrigation system valves to increase water flow through the chiller units 152, thus by countering the effects of the ambient temperature increase and maintaining a preset water temperature. As another example, if the system is operating from the first tank 110, and sensor unit determines that the nutrient level in the water becomes too low, the system may close the intake line 144 and the output line 140 to the first tank 110 and open the intake line 144 and the output line 140 to the second tank 120 holding nutrient rich fresh water. In this manner, control over system parameters, including, but not limited to, air flow, lighting, water nutrient levels, and water supply, can be automated. Automating control over system parameters reduces human error, improves efficiency in power and water usage, increases crop yields, and reduces labor costs, among other advantages.

Figure 17:
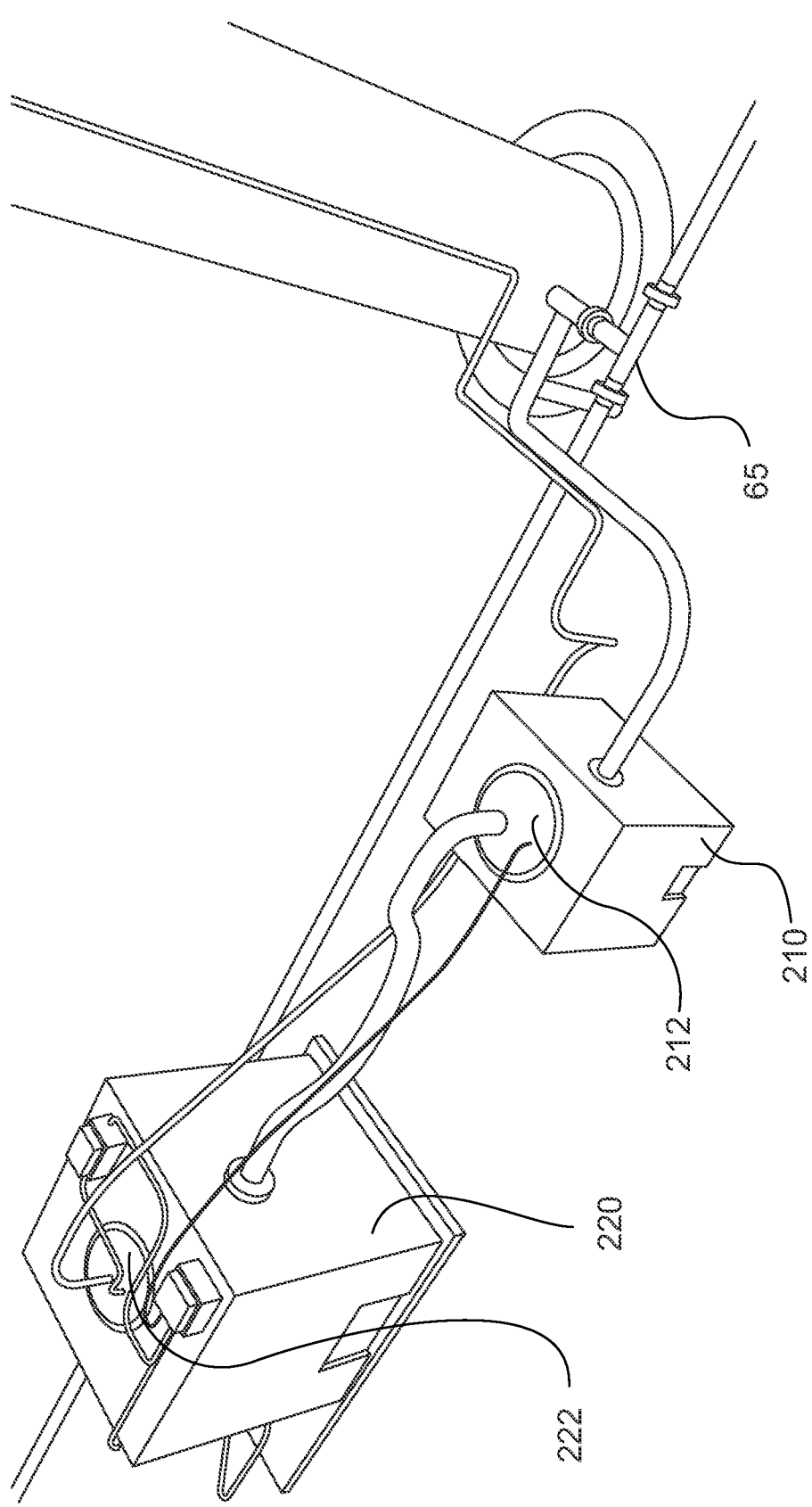
FIG. 17 illustrates a dual tank cleaning system.

The growing system is configured for use with a multi-tank power cleaning system that flushes and cleans system components between harvests. An exemplary cleaning system is depicted in FIG. 17 and includes a return tank 210, a supply tank 220 larger than the return tank 210, a sump pump 212, and a recirculating pump 222. The return tank 210 is in fluid communication with the supply tank 220 through the sump pump 212. In one embodiment, the cleaning system is housed on a cleaning cart 230 designed to position the return tank 210 at a vertical position lower than the grow tower 60 drain line 65, as explained below.

During cleaning, the return tank 210 is placed in fluid communication with the grow tower 60 drain line 65, and the supply tank 220 is placed in fluid communication with the nozzle 70 inlet port 64 through the recirculating pump 222. The supply tank 220 is charged with a cleaning solution, which can be, for example, a hydrogen peroxide solution. The recirculating pump 222 pumps cleaning solution from the supply tank 220 to the inlet port 64 where it is circulated through the nozzle 70 and the interior of the grow tower 60. The return tank 210 can be positioned lower than the grow tower 60 drain line 65 so that gravitational forces cause the excess cleaning solution to flow from the bottom of the grow tower 60 to the return tank 210. The sump pump 212 can be activated to pump excess cleaning solution from the return tank 210 to the supply tank 220 where it can be recirculated through the grow tower 60 as needed.

Figure 18:
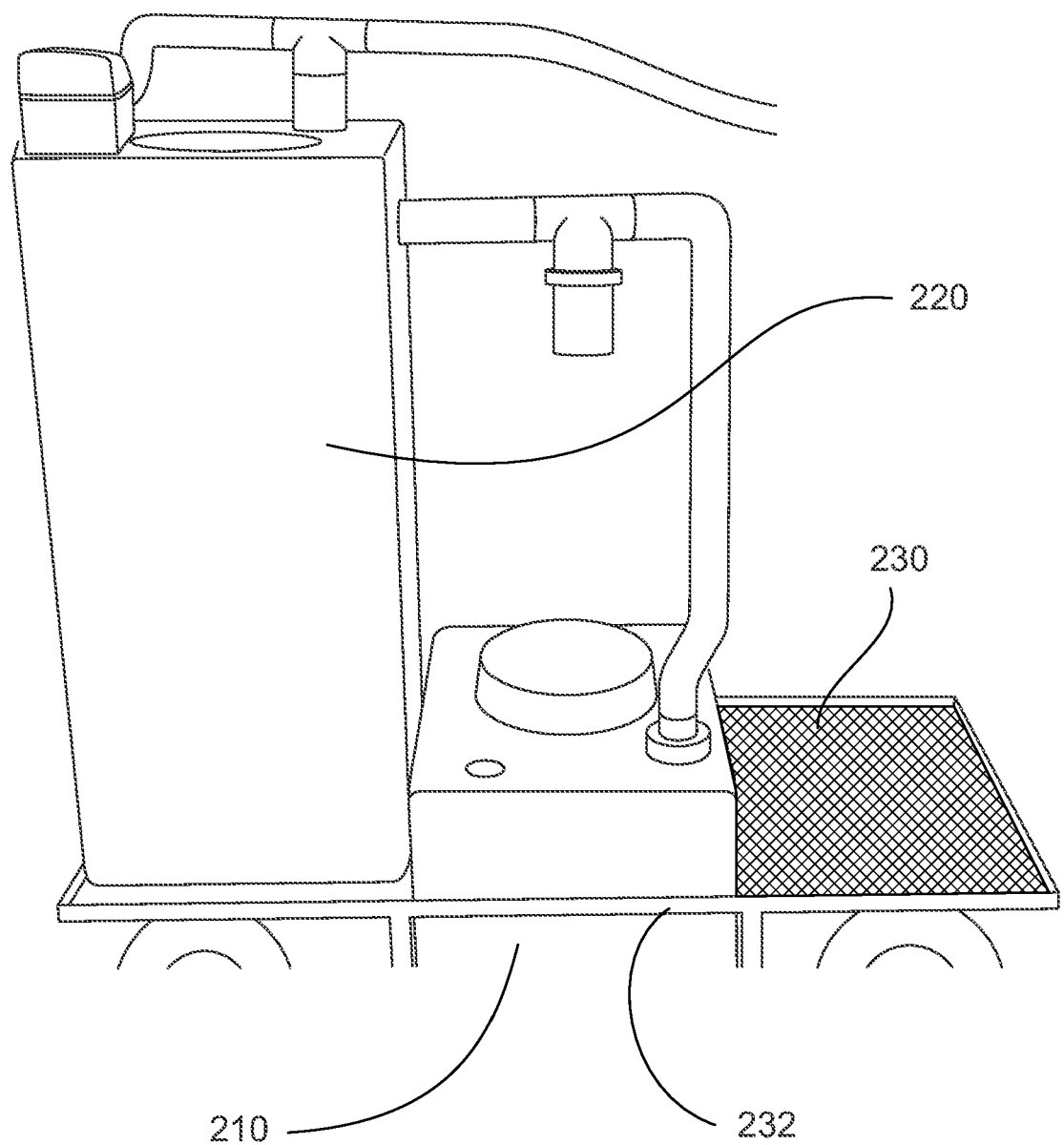
FIG. 18 illustrates a dual tank cleaning system and cart.

In one exemplary embodiment, the supply tank 220 holds a volume of thirty gallons, and the return tank 210 has a volume of approximately ten gallons. The tanks are connected to the grow tower 60 through a flexible one-inch hose or pipe. The sump pump 212 and recirculating pump 222 are sized at approximately 1 horsepower. The cleaning cart 230 is approximately three feet wide and six feet long. The bed of the cleaning cart 230 includes a cutout 232 with a recessed floor or drop shelf where the recess is sized to accommodate the return tank 210, thereby housing the return tank 210 at lower height than the bed of the cart, as depicted in FIG. 18. Between harvests, the cleaning system can be run for approximately thirty minutes to clean and sterilize the system.

Prior to placing plants in the grow tower 60 to begin a new harvest, the plants are first developed from clones. In one exemplary cloning process, one or more clones are cut from off shoots of the main stem of a mother plant where the cut is made at a forty-five degree angle relative to the stem. The clones are treated with a rooting power or gel before being placed in a growing medium within a small planter (e.g., a one inch by two inch cube). The individual planters are placed into larger flood trays filled with nutrient-rich water and allowed to sit for seven to fourteen days while the clones develop roots. During this period, the clones may be watered multiple times per day and exposed to computer-controlled lighting that gradually increases in intensity over time to avoid burning the clones.

The nutrient content of the water within the flood tray may be altered as the clones develop roots, and the clones may be permitted to grow for another three to five days. When the clones reach a target size, they are removed from the flood trays and planted within the grow tower 60 to complete the growing process. Initially, the clones within the grow tower 60 are exposed to the same lighting intensity as they were in the flood trays immediately prior to removal. The lighting intensity may then be increased over time as the plants mature within the grow tower 60.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A horticultural cleaning system comprising:
   (a) first tank having (i) a first inlet port in fluid communication with a horticultural system drain port, (ii) a first outlet port, (iii) a first pump in fluid communication with the first outlet port, and (iv) a first pump outlet line in fluid communication with the first pump;
   (b) a second tank having (i) a second inlet port in fluid communication with the first pump outlet line, (ii) a second outlet port, (iii) a second pump in fluid communication with the second outlet port, and (iv) a second pump outlet line in fluid communication with the second pump and in fluid communication with a horticultural system input line; and
   (c) a mobile cart having (i) a first storage platform sized to seat the first tank, and (ii) a second storage platform sized to seat the second tank, wherein (iii) the first storage platform is formed within a cart recess so that the first storage platform is lower than the second storage platform, and wherein (iv) when the first tank is seated in the first storage platform, the first tank first inlet port is positioned below the horticultural system drain port;
   (d) wherein (i) the second pump is configured to pump cleaning fluid from the second tank to the horticultural system input line, (ii) the first tank is configured to receive the cleaning fluid from the horticultural system drain port.

2. The horticultural cleaning system of claim 1, wherein the cleaning fluid is a hydrogen peroxide solution.

3. The horticultural cleaning system of claim 1, wherein the first inlet port is connected to the horticultural system drain port through a flexible hose.

4. The horticultural cleaning system of claim 1, wherein the second pump outlet line is connected to the horticultural system inlet line through a flexible hose.

5. A horticultural cleaning system comprising:
   (a) a first tank that is configured to receive a cleaning fluid from a horticultural system drain port, wherein the first tank comprises (i) a first inlet port in fluid communication with the horticultural system drain port, (ii) a first outlet port, (iii) a first pump in fluid communication with the first outlet port, and (iv) a first pump outlet line in fluid communication with the first pump; and
   (b) a second tank having (i) a second inlet port in fluid communication with the first pump outlet line, (ii) a second outlet port, (iii) a second pump in fluid communication with the second outlet port, and (iv) a second pump outlet line in fluid communication with the second pump.

6. The horticultural cleaning system of claim 5 further comprising a mobile cart having (a) a first storage platform sized to seat the first tank, and (b) a second storage platform sized to seat the second tank, wherein (c) the first storage platform is formed within a cart recess so that the first storage platform is lower than the second storage platform.

7. A method for cleaning a horticultural system comprising the steps of:
   (a) providing first tank having (i) a first inlet port, (ii) a first outlet port, (iii) a first pump in fluid communication with the first outlet port, and (iv) a first pump outlet line in fluid communication with the first pump;
   (b) providing a second tank having (i) a second inlet port in fluid communication with the first pump outlet line, (ii) a second outlet port, (iii) a second pump in fluid communication with the second outlet port, and (iv) a second pump outlet line in fluid communication with the second pump;
   (c) placing the first inlet port in fluid communication with a horticultural system drain port;
   (d) placing the second pump outlet line in fluid communication with a horticultural system input line;
   (e) providing a cleaning solution stored within the second tank;
   (f) pumping, using the second pump, cleaning solution from the second tank to the horticultural system inlet line; and
   (g) receiving by the first tank through the first tank inlet, the cleaning fluid from the horticultural system drain port.

8. The method for cleaning a horticultural system of claim 7 further comprising the step of pumping by the first pump, a cleaning fluid from the first tank to the second tank.

9. The method for cleaning a horticultural system of claim 7 further comprising the step of pumping by the first pump, a cleaning fluid from the first tank to the second tank when a cleaning fluid volume in the second tank falls below a predetermined threshold.

10. The method for cleaning a horticultural system of claim 7, wherein the cleaning fluid is a hydrogen peroxide solution.

11. The method for cleaning a horticultural system of claim 7, wherein the first tank first inlet port is positioned below the horticultural system drain port.

12. The method for cleaning a horticultural system of claim 11 further comprising the steps of:
   (a) providing a mobile cart having (a) a first storage platform sized to seat the first tank, and (b) a second storage platform sized to seat the second tank, wherein (c) the first storage platform is formed within a cart recess so that the first storage platform is lower than the second storage platform; and
   (b) prior to connecting the first inlet port and the second pump outlet port to the horticultural system, the mobile cart is used to situate the first tank and second tank proximal to the horticultural system.

13. The method for cleaning a horticultural system of claim 7 further comprising the step of harvesting a crop from the horticultural system prior to connecting the first inlet port and the second pump outlet port to the horticultural system.

* * * * *